United States Patent

[11] 3,542,159

| [72] | Inventor | William J. Kestermeier<br>South Bend, Indiana |
|---|---|---|
| [21] | Appl. No. | 789,272 |
| [22] | Filed | Jan. 6, 1969 |
| [45] | Patented | Nov. 24, 1970 |
| [73] | Assignee | The Bendix Corporation<br>a corporation of Delaware |

[54] CALIPER TYPE DISC BRAKE INCLUDING PIVOTED SECTIONS
6 Claims, 6 Drawing Figs.

[52] U.S. Cl. .................................................. 188/72.6,
188/106
[51] Int. Cl. ........................................ F16d 55/224
[50] Field of Search ............................................. 188/73,
73A, 106F, 59, 76

[56] References Cited

UNITED STATES PATENTS

| 3,213,969 | 10/1965 | Rosanowski et al. .......... | 188/73 |
| 3,388,774 | 6/1968 | Burnett .......................... | 188/73 |
| 3,460,651 | 8/1969 | Burnett .......................... | 188/106FX |

FOREIGN PATENTS

| 231,493 | 10/1960 | Australia ....................... | 188/73 |
| 938,978 | 10/1963 | Great Britain ................. | 188/73 |

*Primary Examiner*—George E. A. Halvosa
*Attorneys*—C. F. Arens and Plante, Arens, Hartz, Hix and Smith ABSTRACT: This invention relates to a floating head caliper type disc parking brake, wherein the caliper is comprised of members which are pivotally interconnected so as to permit wrenching of friction elements against said disc in response to mechanical actuation.

INVENTOR.
WILLIAM J. KESTERMEIER
BY
Plante, Arens, Hartz, Hix & Smith
ATTORNEYS

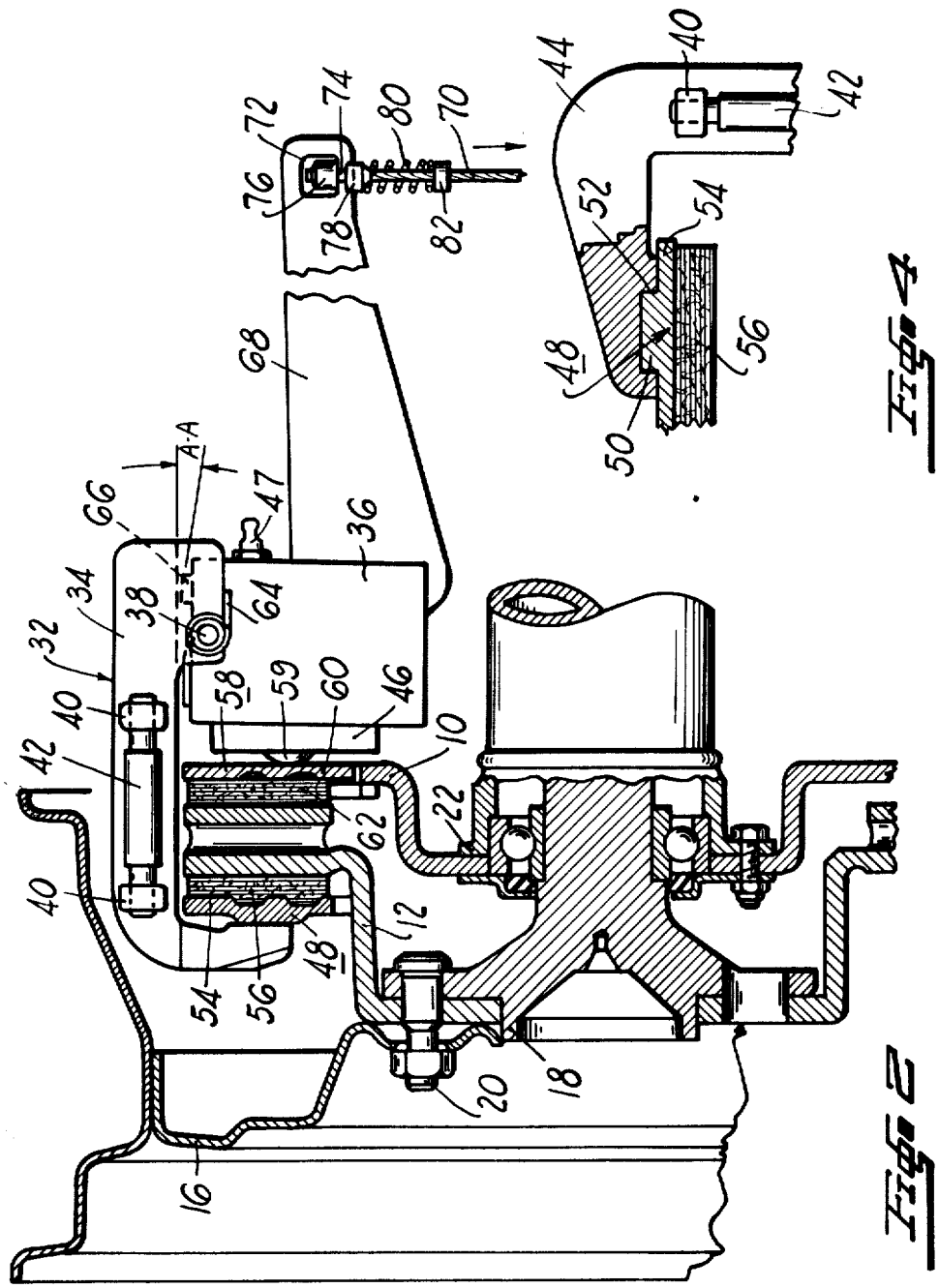

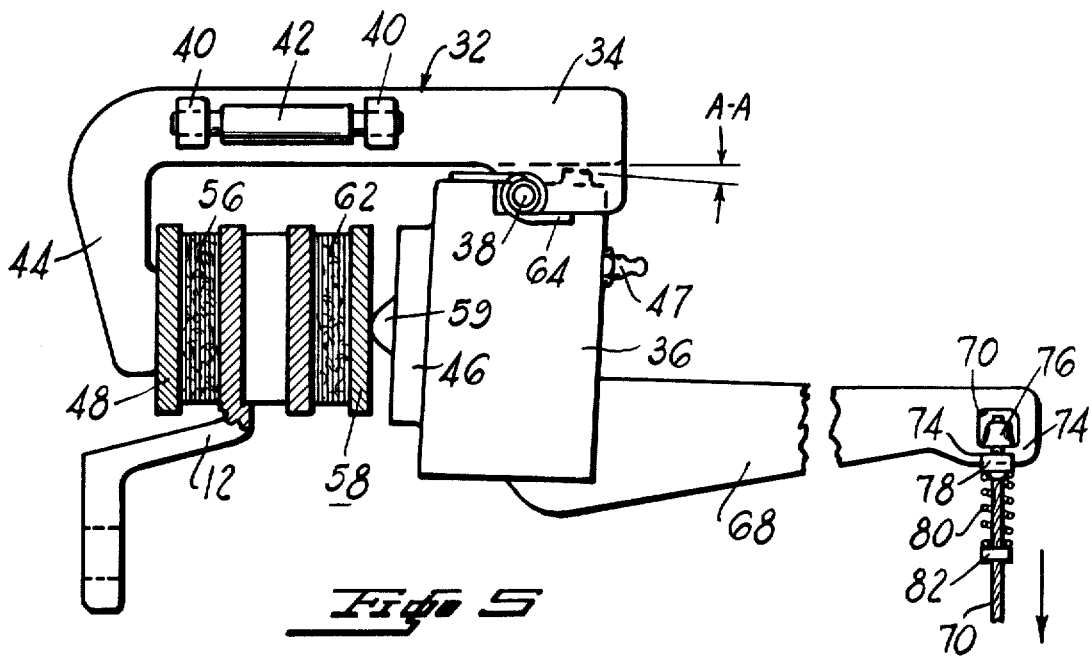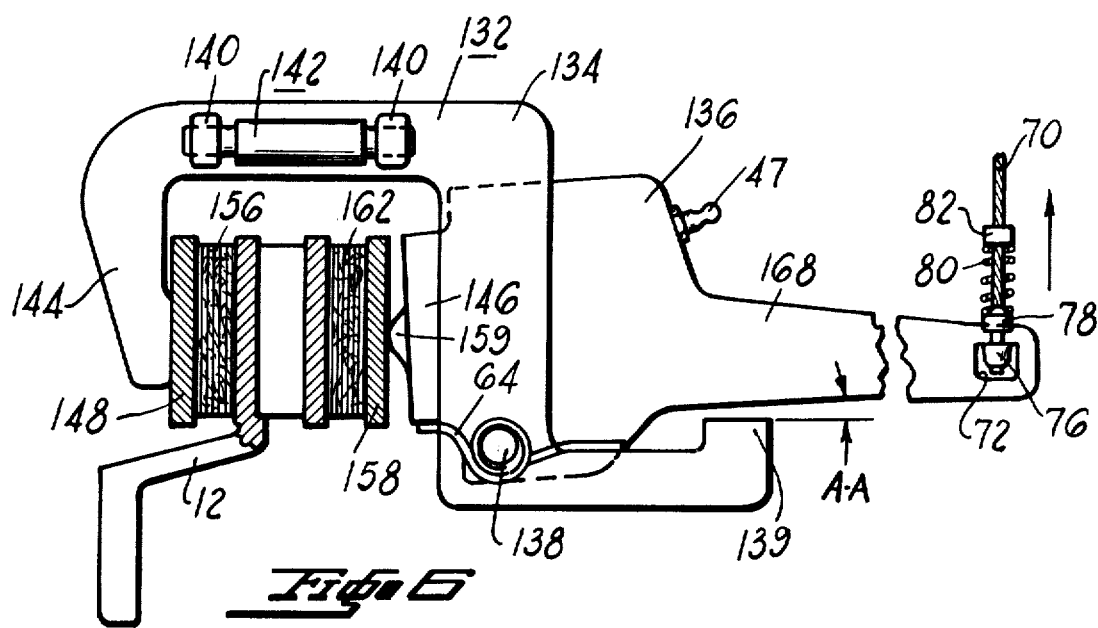

3,542,159

1

CALIPER TYPE DISC BRAKE INCLUDING PIVOTED SECTIONS

SUMMARY OF THE INVENTION

This invention, in general, concerns an improvement to pending U.S. Pat. application Ser. No. 682,846, now U.S. Pat. No. 3,460,651, having a common assignee, and specifically relates to a parking brake for use with a disc type brake.

It is an object of this invention to provide a disc parking brake having a floating head caliper that affords improved mechanical efficiency when gripping the disc or rotor.

It is an object of this invention to provide a disc parking brake that readily disengages the friction elements from the disc upon release of said brake.

It is an object of this invention to provide a disc parking brake mechanism which is so designed as to permit angular motion between the members comprising the floating head caliper to wrench the friction elements against said brake disc.

Other objects and features of the invention will be apparent from the following description of the disc parking brake taken in connection with the accompanying drawings.

BRIEF DESCRIPTION OF THE DRAWINGS

FIG. 2 is a partial sectioned side view of the disc brake and wheel assembly for the vehicle;

FIG. 4 is a sectioned view of the caliper showing its connection with the outer friction element;

FIG. 5 is a schematic view of the floating head caliper with a mounting arrangement such that upon a downward force wrenches the friction elements against the disc for braking; and FIG. 6 is a schematic view of a modified form of the caliper shown in FIG. 5 that upon an upward force wrenches the friction elements against the disc for braking.

DESCRIPTION OF THE PREFERRED EMBODIMENTS

Figure 1:
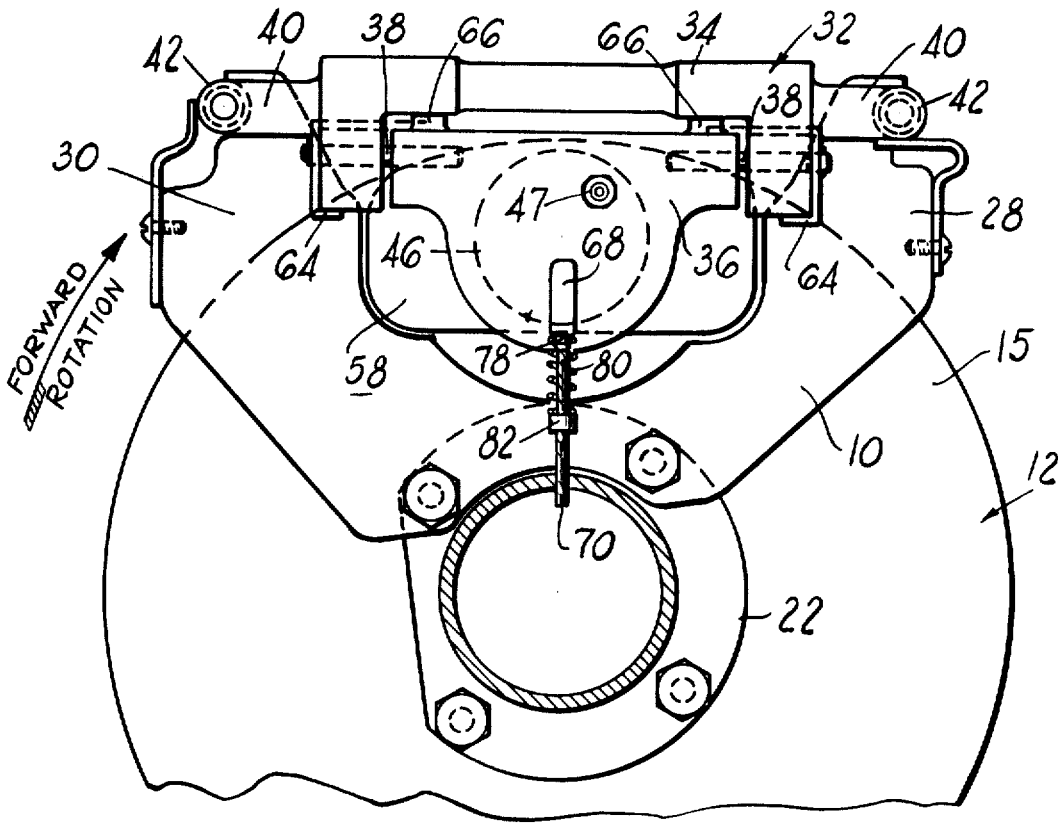
FIG. 1 is a partial elevational view of the disc brake of the invention taken from the inboard side as mounted on a vehicle.
Figure 3:
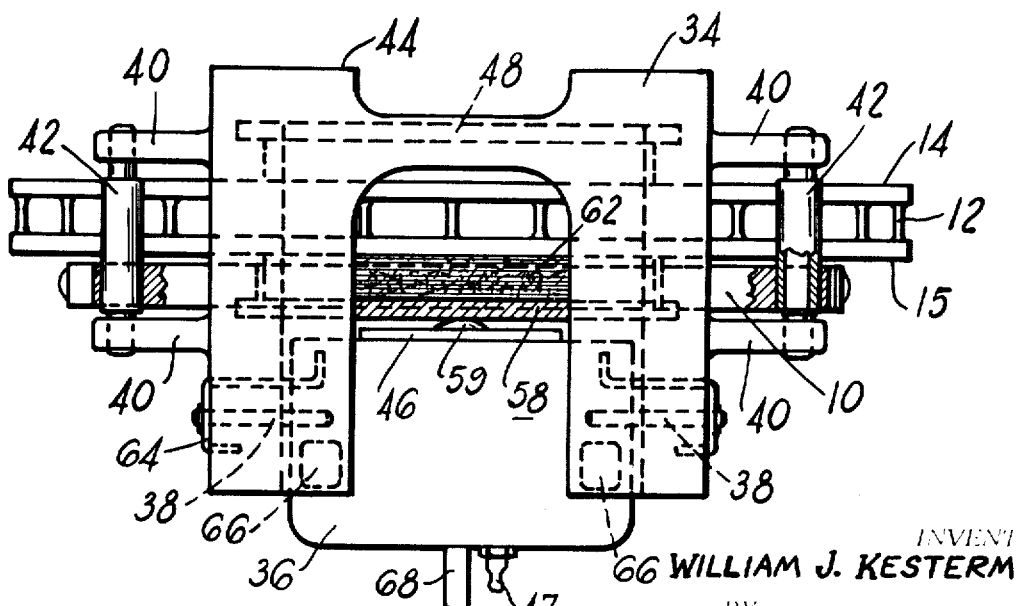
FIG. 3 is a top plan view of the floating head caliper and its mounting technique with respect to the torque taking member.

With reference now to the drawings, there is illustrated a fixed support or torque taking member 10 positioned along one side of a rotor 12 which is provided with annular opposed friction faces or surfaces 14 and 15. The rotor is connected to a wheel 16 and an axle flange 18 by bolts 20. The torque taking member 10 is attached to a fixed part of a vehicle, such as an axle housing 22. The torque taking member 10 has a pair of circumferentially spaced arms 28 and 30. The arms are an integral part of the torque taking member 10. A caliper housing 32 straddles the rotor and is slidably mounted on the torque taking member 10 for movement in an axial direction toward and away from said rotor 12. The caliper housing 32 is comprised of a first member 34 and a second member 36. The second member 36 is operatively connected to said first member 34 by means of pins 38 which are press fit into said second member 36 and free to rotate in said first member 34. It is noted that the pins 38 may alternatively be threaded on one end for threadable engagement with said first member 34. The first member 34 has lateral extensions 40 which carry bearing members 42 which, in turn, are respectively carried on said pair of circumferentially spaced arms 28 and 30. The first member 34 has a portion 44 extending radially inwardly, adjacent friction face 14. The second member 36 extends radially inwardly adjacent friction face 15. The second member 36 has embodied therein a conventional hydraulic actuator mechanism 46 (but not shown in detail) which is responsive to a pressurizable hydraulic fluid through fluid inlet 47 to accomplish a braking application.

A friction element 48 is carried on the radially inwardly extending projection 44 and lies adjacent said face 14 of the rotor 12 in contact therewith. The friction element 48 is removably attached to the radial portion 44 via inserting projections 50 integral with the friction element, into openings 52 of said radial portion 44. The friction element 48, as shown herein, comprises a backing plate 54 and a friction lining 56.

The torque taking member 10, slidably supports a friction element 58 between the circumferentially spaced arms 28 and 30 for frictional engagement with said face 15 of the rotor surface opposite to the side engaged via the friction element 48. The friction element 58 comprises a backing plate 60 and a friction lining 62. Obviously, the friction elements 48 and 58 might well be one piece if the friction material were sufficiently strong structurally to take the compressive forces without the aid of the backing plates.

The conventional actuator mechanism 46 is positioned adjacent the friction element 58 for moving said friction element into frictional engagement with surface 15 of said rotor 12 upon energization of said mechanism 46.

The first and second members 34 and 36, respectively, have interposed therebetween a spring means 64 to preload said second member 36 against said first member 34. As may be seen best in FIG. 1, said second member 36 has abutments 66 which engage said first member 34. Thus, the caliper housing 32 floatingly straddles the rotor 12 in such a manner that the actuator mechanism 46 and frictional elements 48 and 58 are in substantial axial alinement. The actuator mechanism 46 is operatively connected to the friction element 58 through a protuberance 59 forming an arcuate point contact, and to the friction element 48 through the caliper housing 32, so that the application of hydraulic pressure to said actuator causes the friction elements 48 and 58 to grip the rotor 12 in accomplishing a braking application.

A parking brake lever 68 is rigidly attached to said second member 36 and projects axially therefrom for operable cooperation with a cable 70. The parking brake lever 68 has a "C" shaped opening 72 having pincer-like arms 74 for receiving and retaining said cable 70. A lug 76 is suitably installed on the end of the cable and crimped thereto to operatively secure said cable to said parking brake lever. A retainer means 78 having a bifurcated end is preloaded against the parking brake lever 68 via a spring 80 which has its other end abutting against a rigid portion 82, which may be a part of the vehicle not shown.

A slightly modified form of the invention is shown in FIG. 6. HOwever, since its structure is almost identical to the preferred embodiment, the numeral 100 has been added to those parts corresponding to similar parts of the preferred embodiment. It will be observed that the second member 136 which carries the actuator mechanism 146 is normally rotated clockwise about pin 138, thus causing the arm 168 to abut a step member 139, formed as an integral part of the first member 134. To apply the parking brake, parking brake lever 168 is rotated counterclockwise about pivot pin 138.

MODE OF OPERATION OF THE PREFERRED EMBODIMENT

Now with regard to the parking brake application of the caliper housing 32, your attention is directed to FIGS. 5 and 6, showing applicant's invention in schematic form for both upward and downward pull, parking brake operation. As may be seen from the drawings, the cable may be operated to pivot said second member 36 with respect to said first member 34 by an angular amount, shown in the drawings as AA, to push said friction element 48 into engagement with said rotor face 15 and transmit a force through said second member 36, said pins 38 and said first member 34 to engage said friction element 48 with said rotor face 14 thereby causing said friction elements, respectively, to grip the rotor 12 to accomplish a parking brake application.

Upon release of said cable the spring 80 will return the parking brake lever 68 to its original position and said abutments 66 of said second member 36 will return to their original position so as to engage said first member 34 in response to the return action of the spring means 64. It is mentioned here that some adaptations of this invention may not require the use of the spring means 64.

Obviously, many modifications and variations of the present invention are possible in light of the above teachings. It is intended to cover all changes and modifications of the embodiments set forth herein which do not constitute departures from the spirit and scope of the invention.

I claim:
1. A disc brake comprising:
a rotor having a pair of friction surfaces;
a fixed support having two circumferentially disposed arms;
a caliper housing mounted to said fixed support in straddling relationship to said rotor;
a pair of pin means, one associated with a respective one of said two arms;
a pair of friction elements one located adjacent each of said friction surfaces and operatively connected to said caliper housing for braking said rotor;
said caliper housing including first and second members;
one of said members being slidingly connected to said pair of pin means, and the other of said members being rotatably connected to said one member such that rotation of said other member slides said one member on said pair of pin means to cause said friction elements to engage said rotor friction surfaces; and
lever means rigidly secured to said other member for rotating the later.

2. The invention of claim 1; and
a fluid actuating mechanism mounted in said other member for forcing said friction elements against said friction faces.

3. In a disc brake:
a rotor having a pair of friction faces;
a torque member;
a pair of friction elements, one disposed adjacent each of said friction faces;
a caliper including a first member extending generally parallel to one of said friction faces and operably connected to one of said friction elements and a second member operably connected to the other friction element extending axially across said rotor and then radially inwardly parallel to the other friction face;
bearing means slidably mounting said second member on said torque member;
pivot means interconnecting said first and second members;
said first member including a fluid actuator for forcing said friction elements against their corresponding friction faces; and
lever means rigidly secured to said first member for pivoting the latter to force said one element against said one friction face and to slide said second member on the torque member to force the other friction element against the other friction face.

4. The invention of claim 3:
said one friction element being slidably mounted on said torque member; and
force transmitting means operatively connected to said second member for sliding said one element on the torque member upon pivoting of the first member and upon actuation of said fluid actuator.

5. The invention of claim 3; and
resilient means operably connected to said first and second members for returning said first member to its normal position upon pivoting of the latter.

6. The invention of claim 5:
said pivot means being a pair of pins extending generally parallel to said friction faces;
said resilient means being a pair of coil springs, each of said springs being disposed concentrically with said pins and having a pair of spring arms; and
one of said arms engaging said one member the other arm engaging the other member.